United States Patent [19]

Sojka

[11] Patent Number: 5,777,054
[45] Date of Patent: Jul. 7, 1998

[54] PROCESS FOR PRODUCING AN OIL SORBENT POLYMER AND THE PRODUCT THEREOF

[75] Inventor: Milan F. Sojka, Algonquin, Ill.

[73] Assignee: AMCOL International Corporation, Arlington Heights

[21] Appl. No.: 811,122

[22] Filed: Mar. 3, 1997

Related U.S. Application Data

[62] Division of Ser. No. 486,107, Jun. 7, 1995, abandoned.

[51] Int. Cl.[6] ..................................................... C08F 20/10
[52] U.S. Cl. ............................................................ 526/323.2
[58] Field of Search ............................................ 526/323.2

[56] References Cited

U.S. PATENT DOCUMENTS

| | | |
|---|---|---|
| 4,382,124 | 5/1983 | Meitzner et al. . |
| 4,414,278 | 11/1983 | Cohen et al. .................. 428/402 |
| 4,920,187 | 4/1990 | Kashihara et al. ............. 526/193 |
| 5,147,937 | 9/1992 | Frazza et al. . |
| 5,238,736 | 8/1993 | Tseng et al. .................... 428/327 |
| 5,292,835 | 3/1994 | Jahns et al. ..................... 526/73 |

FOREIGN PATENT DOCUMENTS

| | | | |
|---|---|---|---|
| 59-202213 | 11/1984 | Japan | ................ 526/323.2 |
| 63-146901 | 6/1988 | Japan | ................ 526/89 |
| 967051 | 8/1964 | United Kingdom . | |
| 2 090 264 | 7/1982 | United Kingdom . | |

Primary Examiner—Joseph L. Schofer
Assistant Examiner—N. Sarofin
Attorney, Agent, or Firm—Marshall, O'Toole, Gerstein, Murray & Borun

[57] ABSTRACT

The present invention is directed to a porous terpolymer microparticle having a high oil absorbency. The method of the present invention comprises the steps of:

dissolving butyl methacrylate, allyl methacrylate, and an ethylene glycol dimethacrylate in a mole ratio of about 1:3 to 5:5 to 7 respectively, along with an effective amount of oil soluble polymerization initiator in a volatile and a substantially water immiscible organic solvent to provide a monomer mixture;

adding the monomer mixture to a larger volume of an aqueous solution having an effective amount of a suspension stabilizer dissolved therein to form an organic/aqueous biphasic liquid system;

vigorously stirring the biphasic liquid system at a rate sufficient to cause the water immiscible organic phase to be suspended as microdroplets in the aqueous phase;

allowing polymerization to occur in the suspended microdroplets to produce a microporous terpolymer microparticle therein; and separating the microporous terpolymer microparticle from the volatile and substantially water immiscible organic solvent to produce a microporous and oil sorbent terpolymer microparticle characterized by having a mean diameter of less than 25 microns and a total sorption capacity for mineral oil that is 72% by weight or greater.

The present invention is further directed to a microporous and oil adsorbent microparticle comprising a terpolymer of butyl methacrylate, allyl methacrylate and an ethylene glycol dimethacrylate in a mole ratio of 1:3 to 5:5 to 7 respectively, the microparticle characterized by having a mean unit diameter of less than 25 microns and a total sorption capacity for mineral oil that is 72% by weight or greater.

16 Claims, 1 Drawing Sheet

PROCESS FOR PRODUCING AN OIL SORBENT POLYMER AND THE PRODUCT THEREOF

CROSS REFERENCE TO RELATED APPLICATION

This application is a divisional of application Ser. No. 08/486,107 filed Jun. 7, 1995, now abandoned.

BACKGROUND OF THE INVENTION

A. Field of the Invention

The present invention relates to a process for producing an oil sorbent polymer in micro-particle form. More particularly, the present invention relates to a process for producing a highly porous and hydrophobic terpolymer characterized by a mean unit particle size of about 1 to about 102 microns and an oil sorbency of 72% by weight or greater. The present invention is also directed to the oil sorbent microparticles produced by the process. The present invention is useful because the particles produced thereby are capable of holding and releasing hydrophobic oils, creams, cleaners and medicaments, for use in the cosmetic, cleaning, and pharmaceutical industries.

B. Background

The first disclosures of polymer particles appear in U.S. Pat. Nos. 3,493,500 and 3,658,772, which issued on Feb. 3, 1970 and Apr. 25, 1972, respectively. They teach the production of aqueous suspensions of polymer particles from acrylic acid monomer and/or acrylamide monomer in an aqueous reaction medium at pH 1–4. Both patents teach that the resultant polymer suspensions, which were not characterized as to particle size or structure, were suitable for use as flocculating agents for sewage treatment.

It was subsequently discovered that polymers could be made in a porous particulate form by a variety of techniques. The art has stated that "the type of polymerization technique used is an important factor in the determination of the resulting product." See U.S. Pat. No. 4,962,170 at col. 2, ln. 4. The art has further recognized that "within each type of polymerization, there are procedural alternatives which can have significant impact on the resulting product." See Id. at line 7–8. In addition to significant impact of procedural alternatives, the art has stated that "[t]he differences in the polymerization techniques are enough that a procedure used in one type of polymerization technique that will not necessarily have the same effect if used in another polymerization technique." '170 at col. 2, ln. 8–11. Thus, there is a significant degree of unpredictability in the art.

Porous polymeric particles are capable of being prepared by one of two processes—precipitation polymerization in a single solvent system, or suspension polymerization in a two phase liquid system. The precipitation polymerization technique is presented in U.S. Pat. Nos. 4,962,170 and 4,962,133 both of which issued on Oct. 9, 1990. The '170 patent discloses a precipitation polymerization process wherein the disclosed monomers are soluble in the single solvent system, whereas the resulting polymer, which is insoluble, precipitates out of solution once a critical size is obtained. In the '170 process, the solution of monomer consists exclusively of one or more types of polyunsaturated monomer. Because each monomer is polyunsaturated, each monomer also functions as a cross-linker, resulting in a highly cross-linked polymer particle.

Like the '170 patent, the '133 patent also utilizes the precipitation polymerization process for producing a porous polymeric particle. However, unlike the '170 process, wherein the monomer solution consists exclusively of polyunsaturated monomers, the '133 process discloses the monomer solution may include one monosaturated monomer in combination with one polyunsaturated monomer.

The '133 process is limited to a solvent system that is an aqueous/organic azeotrope. Because the organic member cannot be separated from the aqueous member in an azeotrope, azeotropic solutions present special waste disposal problems. Accordingly, it is an object of the present invention to provide a process for making sorbent micropolymers that does not require an azeotropic solution. Further, the particles produced by the '133 process range extensively in size from less than about 1 micron in average diameter for unit particles to about twelve hundred microns in average diameter for clusters of fused aggregates. The large variability in size limits the utility and properties of the polymeric particles. Accordingly, it is also an object of the present invention to discover a process for making polymeric microparticles of a less diverse size.

A second process disclosed in the art for producing microscopic polymers is in situ suspension polymerization wherein the precipitating agent is the active ingredient around which polymerization occurs. Examples of in situ suspension polymerization include U.S. Pat. No. 4,724,240 wherein polymerization of a monounsaturated monomer and a polyunsaturated monomer in an aqueous/polyvinylpyrrolidone system containing an emollient, as the active agent, produced relatively large microparticles, having a mean diameter "between 0.25 to 0.5 mm" (250 to 500 microns) that already contain the emollient therein. A problem with a particle having a mean diameter of 250–500 micron is that the particle is capable of being sensed by touch. This is an undesirable property if the particle is to be used in a lotion or cream. Accordingly, it is also an object of the present invention to provide a process that is capable of manufacturing polymeric particles having a smaller mean diameter for a smoother feel.

A second problem with the process of the '240 patent is that it is limited to those active ingredients that are capable of dissolving in the solvent. Further, the active ingredient(s), which may be proprietary, must be provided in bulk to the polymer manufacturer so that they may become trapped in the particles during the polymerization process. To overcome these problems, it is a further object of the present invention to provide polymeric microparticles having evacuated pores that are capable of imbibing hydrophobic fluids in large amounts so that they may be loaded with active proprietary ingredient(s) by any individual manufacturer who incorporates them as release agents in their technology.

A third problem with the '240 process is that it is not suited for use when the active ingredient is a mixture of components that differ significantly from one another as to lipophilicity. In such a situation, the more lipophilic of the active ingredients would be selectively isolated in the pores of the polymer made by the '240 process. To overcome this problem, the '240 process would have to be separately applied to each of the active ingredients, and thereafter, the resulting products would be mixed. However, such additional processing and mixing is costly. Accordingly, it is a further object of the present invention to provide a process for producing a microparticle wherein the microparticle is capable of receiving a plurality of active ingredients.

SUMMARY OF THE INVENTION

It was unexpectedly discovered that the process of the present invention is capable of producing microparticles that have not only a high oil absorbency, but that also exhibit a substantially uniform particle size.

The present invention is directed to a process for making a porous polymer of microparticulate size that exhibits a high oil sorbency. The method of the present invention comprises the steps of:

dissolving the three monomers: butyl methacrylate, allyl methacrylate, and an ethylene glycol dimethacrylate, in a mole ratio of about 1:3 to 5:5 to 7 respectively, along with an effective amount of an organic polymerization initiator in a volatile and a substantially water immiscible organic solvent to provide a monomer mixture;

adding the monomer mixture to an excess of an aqueous solution having an effective amount of a suspension stabilizer dissolved therein to form an organic/aqueous biphasic liquid system;

vigorously stirring the biphasic liquid system at a rate sufficient to cause the water immiscible organic phase to be suspended as microdroplets in the aqueous phase;

allowing polymerization of the three monomers to occur in the suspended microdroplets to produce a microporous terpolymer microparticle therein; and separating the microporous terpolymer microparticle from the volatile and substantially water immiscible organic solvent to produce a microporous and oil sorbent terpolymer microparticle having a mean unit diameter of less than about 25 microns and a total sorptive capacity for mineral oil that is 72% by weight or greater.

The present invention is further directed to a microporous, and oil sorbent microparticle comprising a terpolymer of butyl methacrylate, allyl methacrylate and an ethylene glycol dimethacrylate, the microparticle characterized by having a mean unit diameter of less than 25 microns and a total sorption capacity for mineral oil that is 72% by weight or greater.

In the product and process of the present invention, the preferred ethylene glycol dimethacrylate is monoethylene glycol dimethacrylate. In a preferred embodiment, the microparticles of the present invention are characterized by a mean unit diameter from 1 to 20 microns, more preferably, from 1 to 16 microns.

DETAILED DESCRIPTION OF THE INVENTION

Figure 1:
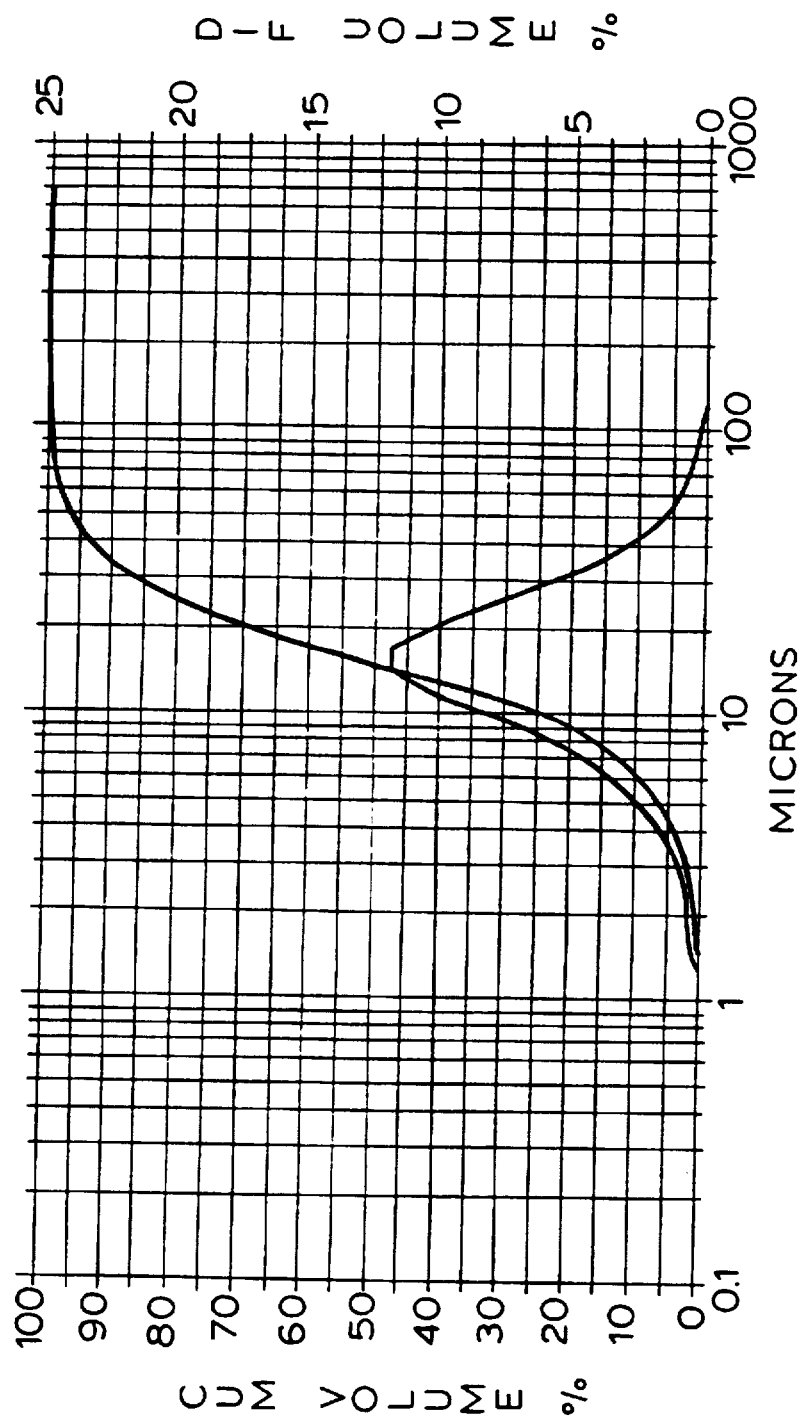
FIG. 1 is a particle size distribution analysis of a mixture of several of the microparticle products produced by the process of the present invention as measured on a MICROTRAC Full Range Particle Analyzer, (Ver. 4.12), reflecting a spread of about 100 microns, a mean unit diameter of about 15 microns, and that 80% of the particles in the mixture have a size between 6.2 and 32.7 microns.

The present invention has two aspects. In its first aspect, it is directed to a process for making a polymer in a porous microparticle form that is capable of sorbing high volumes of lipophilic (hydrophobic) liquids. The process of the present invention comprises the steps of:

dissolving the three monomers: butyl methacrylate, allyl methacrylate and an ethylene glycol dimethacrylate in a mole ratio of about 1:3 to 5:5 to 7 respectively, along with an effective amount of an organic polymerization initiator in a volatile and substantially water immiscible organic solvent to provide a monomer mixture;

combining the monomer mixture with a larger volume of an aqueous solution having an effective amount of a suspension stabilizer dissolved therein to form a biphasic liquid system;

vigorously stirring the biphasic liquid system at a rate sufficient to cause said water immiscible organic phase to be suspended as microdroplets in said aqueous phase;

allowing polymerization to occur in said suspended microdroplets to produce a microporous, terpolymer microparticle therein; and separating said microporous terpolymer microparticle from said volatile and substantially water immiscible organic solvent to produce a microporous and oil sorbent terpolymer microparticle characterized by having a mean unit diameter of less than about 25 microns and a total sorptive capacity for mineral oil that is 72% by weight or greater, based upon the weight of the polymer.

The term "sorptive" (or "sorption") is used herein to refer to the capability or capacity of the microparticles of the present invention to both adsorb and absorb a lipophilic material. In discussing microparticles, the art loosely uses the term "'adsorptive," such as in total adsorptive capacity" or in "free flowing absorptive capacity." However, it is understood that references in the art to "total adsorptive capacity" inherently include the total absorptive capacity of a particle as well, unless otherwise defined. Likewise, preferences in the art to "free flowing adsorptive capacity" also inherently include the absorptive capacity as well.

The process of the present invention utilizes three monomers: butyl methacrylate, allyl methacrylate, and an ethylene glycol dimethacrylate in a mole ratio of about 1:3–5:5–7 respectively. A preferred mole ratio is about 1:4:6 respectively. Such a mole ratio is disclosed in Example 1 herein. Of the above monomers, the butyl methacrylate is a monounsaturated monomer, whereas both the allyl methacrylate and the ethylene glycol dimethacrylate are diunsaturated monomers. The diunsaturated monomers also function as cross-linking agents.

By the phrase "an ethylene glycol dimethacrylate" as used herein is meant a member of the group consisting of monoethylene glycol dimethacrylate, diethylene glycol dimethacrylate, triethylene glycol dimethacrylate, and tetraethylene glycol dimethacrylate. The preferred ethylene glycol dimethacrylate is monoethylene glycol dimethacrylate which is commonly known in the art without the "mono" prefix as ethylene glycol dimethacrylate.

The process of the present invention also utilizes an effective amount of an organic polymerization initiator to cause polymerization to occur in the organic phase solvent. By way of example, suitable organic initiators include the organic peroxide initiators, such as dibenzoyl peroxide or t-butyl peroctoate, or the azo initiators. Preferred initiators are the azo initiators such as 2,2'-azobisisobutyronitrile and 2,2'-azobis (2,4-dimethylpentanenitrile). An especially preferred azo initiator is 2,2'-azobis(2,4-dimetylpentanenitrile), which is commercially available under the tradename VAZO 52 from DuPont, Wilmington, Del. It was determined that the use of redox initiators resulted in a polymer product having a decreased oil sorption. A typical effective amount of organic initiator relative to monomer was found to be about 0.5–2% by weight, preferably about 1–1.2% by weight.

In the process of the present invention, the three monomers and the organic initiator are dissolved in a substantially water immiscible organic solvent to produce the organic phase. Suitable substantially water immiscible organic solvents include the aliphatic and aromatic hydrocarbons. Typical of these solvents are toluene, cyclohexane and one or more of the heptanes, alone or in combination. Based upon considerations of boiling point, volatility, toxicity, and solubility, a heptane is the more preferred solvent; most preferably, n-heptane.

The process of the present invention also utilizes an aqueous phase. The aqueous phase comprises an aqueous solution having an effective amount of a suspension stabilizer dissolved therein. Suspension stabilizers are well known to the art. Suitable suspension stabilizers include starch, gum arabic, polyvinyl alcohol, sodium polymethacrylate, magnesium silicate, and methyl cellulose. A preferred suspension stabilizer is methyl cellulose, such as is commercially available from Dow Chemical Company, Midland, Mich., under the tradename Methocel A4C Premium.

In performing the process of the present invention, the organic phase is combined under an inert (e.g., argon or nitrogen) atmosphere with aqueous phase. The combination is typically performed at about room temperature (about 23° C.). The combined phases must be vigorously stirred. The stirring may commence during or after the combination of the two phases. Preferably, the vigorous stirring is employed during the combination of the two phases. More preferably, the organic phase is added slowly with vigorous stirring to the larger volume of the aqueous phase. By the phrase "vigorous stirring" as used herein is meant that the stirring is between about 1000-2000 revolutions per minute ("rpm"), preferably at about 1400-1600 rpm. The function of the vigorous stirring is to facilitate the separation of the organic phase into microdroplets, that with the aid of the suspension stabilizer, become isolated from one another as discrete mini-reaction vessels that are surrounded by water. In the process of the present invention, the water functions not only to separate the microdroplets but also as a heat transfer vehicle for the exothermic polymerization reaction.

The polymerization reaction is allowed to proceed in the vigorously stirred reaction mixture by raising the reaction temperature. As disclosed in Example 1, at about 46° C., some precipitation was observed in the stirred reaction mixture. At about 53° C., massive polymerization was observed. The mixture is then preferably heated to 75° C. to drive the polymerization reaction to completion.

Once polymerization is completed, the resulting microporous terpolymer microparticle is separated from the reaction mixture by filtering or by screening. At this point, however, the separated particles are filled with the water immiscible organic solvent of the reaction mixture. By selecting an organic solvent, that is also volatile, the solvent is readily removed from the pores of the terpolymer particles, preferably by steam distillation. Once the microporous terpolymer microparticles have been separated from the water immiscible organic solvent, such that their lipophilic micropores are now evacuated, they become the microporous and oil sorbent terpolymer microparticles of the present invention.

Thus, the present invention is also directed to a composition of matter—a microporous and oil sorbent micropar-ticle comprising a terpolymer of butyl methacrylate, allyl methacrylate and an ethylene glycol dimethacrylate, in a mole ratio of 1:3 to 5:5 to 7 respectively, the microparticle characterized by having a mean unit diameter of less than about 25 microns and a total sorption capacity for mineral oil that is 72% by weight or greater, based upon the weight of the polymer. The phrase mean "unit diameter" refers to mean diameter of the individual particle and not to the diameter of agglomerates which may form from time to time due to static charge or otherwise. Preferably, the mean unit diameter of the microparticle is from 1 to 20 microns; more preferably, from 1 to 16 microns.

A typical particle size distribution spans about 100 microns with particles generally not less than 1 micron in size. See for example, FIG. 1. FIG. 1 is a particle size distribution of a mixture of several of the microparticle products produced the Examples herein, reflecting a spread of about 100 microns; a mean unit diameter of about 15 microns; that 80% of the microparticles in the mixture have a size between 6.2 and 32.7 microns and a minimum size of at least 1 micron.

Preferably, the microparticle of the present invention has a total sorption capability for mineral oil of 74% by weight or greater; more preferably, 76% by weight or greater; most preferably 78% by weight or greater. It is not expected that the sorption capacity of the polymers of the present invention for light mineral oil would exceed 91% by weight.

The microparticles of the present invention appear as a white powder and constitute free flowing discrete solid particles even when loaded with a lipophilic material to their "free flowing" sorption capacity, e.g., 65% by weight for the particles of Example 1 when loaded with mineral oil. In a preferred microporous and oil sorbent microparticle of the present invention, the ethylene glycol dimethacrylate is monoethylene glycol dimethacrylate. The preparation of such a microparticle is described in Example 1 herein, wherein the mole ratio of butyl methacrylate: allyl methacrylate: monoethylene glycol dimethacrylate was determined to be about 1:4:6.1.

Table I compares the oil adsorption of the (terpolymer) microparticle of Example 1 to the reported oil adsorption for the copolymer microparticles of U.S. Pat. No. 4,962,133, and to that of a commercially available oil sorbent product. The data relative to the copolymers of U.S. Pat. No. 4,962,133 was selected because the '133 copolymers employ two of the three monomers used in the terpolymer of the present invention. Table I establishes that the terpolymer of the present invention (BMA/AMA/EGDM) has a superior total adsorption capacity for mineral oil over both the copolymers of the prior art (BMA/EGDM) and a commercially available copolymer (MMA/EGDM). In particular, the terpolymer of Example 1 of the specification exhibited a total sorption capacity for mineral oil of 78.3% by weight, compared to 72.2% by weight for the best reported BMA/EGDM copolymer of the prior art and 64% by weight for the commercially available product (Dow Corning Product No. 5640).

The abbreviations used herein and in Table I are identified as follows:

| BMA | butyl methacrylate |
| EGDMA | monoethylene glycol dimethacrylate |
| AMA | allyl methacrylate |
| MMA | methyl methacrylate |

TABLE I

| Monomers | Mole Ratio | Solvent | Total Adsorption Capacity For Mineral Oil % By Weight |
|---|---|---|---|
| BMA/EGDM[1] | 1:4 | Hexane | 70.6% |
| BMA/EGDM[1] | 1:1.5 | Hexane | 70.6% |

TABLE I-continued

| Monomers | Mole Ratio | Solvent | Total Adsorption Capacity For Mineral Oil % By Weight |
|---|---|---|---|
| BMA/EGDM[1] | 1.5:1 | Hexane | 72.2% |
| BMA/EGDM[1] | 4:1 | Hexane | 54.5% |
| BMA/AMA/EGDM[2] | 1:4:6 | Heptane | 78.3% |
| MMA/EGDM[3] | 1:1.1 | — | 64% |

[1]Data taken from Table XIV of U.S. Pat. No. 4,962,133 as based upon particles that were prepared by particle precipitation in an azeotrope.
[2]Particle was produced by Example 1 of the present invention.
[3]Dow Corning Product No. 5640, having a reported mean diameter of about 25 microns.

EXAMPLE 1

In particular, 1.75 grams of Methocel A4C Premium was dissolved in 191.1 grams of water in a 2000 ml three-necked resin flask equipped with a stirrer, thermometer, condenser and argon purge. A solution of 17.53 grams of allyl methacrylate, 2.93 grams of butyl methacrylate, 38.23 grams of monoethylene glycol dimethacrylate, 81.07 grams of n-heptane and 0.73 grams of VAZO 52 was bubbled with argon for 10 minutes. The resultant mix was slowly added to the 1,500 rpm stirred aqueous solution of the Methocel at 23° C. under argon. The temperature was raised to 46° C. with constant agitation when precipitation started. Massive polymerization was observed at 53° C. The reaction mixture was then heated to 75° C. and that temperature was held for an additional six hours. Thereafter, the reaction mixture was subjected to steam distillation to remove the heptane and residual monomers. The terpolymer beads were separated from the reaction mixture by filtration. The separated terpolymer beads were washed with deionized water and dried in an oven at 60° C. The dried terpolymer was an odorless white soft powder having a total sorption capacity (i.e., "adsorption capacity" in the art) for light mineral oil of 78.3% by weight, a mole ratio of butyl methacrylate: allyl methacrylate: monoethylene glycol dimethacrylate of about 1:4:6.1, and a corresponding ratio weight percent of 5:30:65.

EXAMPLE 2

Example 1 was repeated except that ratio in weight percent of the referenced monomers was 8:27:65 respectively. The total sorption capacity was comparable to the value obtained in the prior example.

EXAMPLE 3

Example 1 was repeated except that methyl methacrylate was used instead of allyl methacrylate. The total sorption capacity for mineral oil of the resultant terpolymer was 73.7% by weight.

EXAMPLE 4

Example 1 was repeated except that dibenzoyl peroxide replaced VAZO 52 as the initiator. The total sorption capacity for light mineral oil of the resultant terpolymer was 74% by weight.

EXAMPLE 5

Example 1 was repeated. The total sorption capacity for light mineral oil of the resultant product was found to be 78% by weight.

EXAMPLES 6-11

Example 1 was repeated except that the weight percent ("W %") ratio of monomers was as follows:

| BMA (w %) | AMA w(%) | EGDMA (w %) | Total Sorption Capacity (mineral oil) % By Weight |
|---|---|---|---|
| 5 | 30 | 65 | 78.3 |
| 7.5 | 27.5 | 65 | 78.1 |
| 10 | 25 | 65 | 78.2 |
| 15 | 20 | 65 | 78.1 |
| 20 | 15 | 65 | 78.1 |
| 25 | 10 | 65 | 78.0 |

What is claimed is:

1. A process for producing a microporous oil sorbent terpolymer comprising the steps of:

dissolving three monomers: butyl methacrylate, allyl methacrylate, and an ethylene glycol dimethacrylate in a mole ratio of about 1:3 to 5:5 to 7 respectively, along with an effective amount of an organic polymerization initiator in a volatile and substantially water immiscible organic solvent to provide a monomer mixture;

combining said monomer mixture with a larger volume of an aqueous solution having an effective amount of a suspension stabilizer dissolved therein to form a biphasic liquid system;

vigorously stirring said biphasic liquid system at a rate sufficient to cause said water immiscible organic phase to be suspended as microdroplets in said aqueous phase;

allowing polymerization to occur in said suspended microdroplets under vigorous stirring to produce a microporous, terpolymer microparticle therein; and separating said microporous terpolymer microparticle from said volatile and substantially water immiscible organic solvent to produce a microporous and oil sorbent terpolymer microparticle characterized by having a mean unit diameter of less than 25 microns and a total sorptive capacity for mineral oil that is 72% by weight or greater.

2. The process of claim 1 wherein said ethylene glycol dimethacrylate is a member selected from the group consisting of monoethylene glycol dimethacrylate, diethylene glycol dimethacrylate, and triethylene glycol dimethacrylate.

3. The process of claim 2 wherein said ethylene glycol dimethacrylate is monoethylene glycol dimethacrylate.

4. The process of claim 3 wherein said mole ratio is about 1:4:6.

5. The process of claim 3 wherein said water immiscible solvent is an aromatic or aliphatic hydrocarbon.

6. The process of claim 5 wherein said substantially water immiscible organic solvent is a heptane.

7. The process of claim 6 wherein said heptane is n-heptane.

8. The process of claim 5 wherein said suspension stabilizer is a member selected from the group consisting of starch, gum arabic, polyvinyl alcohol, sodium polymethacrylate, magnesium silicate, and methyl cellulose.

9. The process of claim 8 wherein said suspension stabilizer is a methylcellulose.

10. The process of claim 9 wherein said organic polymerization initiator is an azo-nitrile type initiator.

11. The process of claim 10 wherein said azo nitrile type initiator is 2,2'-azobis(2,4-dimethylpentanenitrile).

12. The process of claim 10 wherein the mean unit particle diameter is from 1 to 20 microns.

13. The process of claim 12 wherein the mean unit particle diameter is from 1 to 16 microns.

14. The process of claim 1 wherein said microparticles are further characterized by having a particle size distribution wherein a majority of said microparticles have a particle size between 6.2 and 32.7 microns.

15. The process of claim 1, wherein the suspended microdroplets are stirred at a speed of at least 1000 rpm during polymerization.

16. The process of claim 15, wherein the suspended microdroplets are stirred at a speed of about 1000–2000 rpm during polymerization.

* * * * *